(12) United States Patent
Lorrain et al.

(10) Patent No.: US 12,380,324 B2
(45) Date of Patent: Aug. 5, 2025

(54) ELECTRONIC CALCULATOR FOR THE IMPLEMENTATION OF AN ARTIFICIAL NEURAL NETWORK, WITH CALCULATION BLOCKS OF SEVERAL TYPES

(71) Applicant: Commissariat à l'énergie atomique et aux énergies alternatives, Paris (FR)

(72) Inventors: Vincent Lorrain, Gif sur Yvette (FR); Olivier Bichler, Gif sur Yvette (FR); David Briand, Gif sur Yvette (FR); Johannes Christian Thiele, Gif sur Yvette (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 995 days.

(21) Appl. No.: 17/475,964

(22) Filed: Sep. 15, 2021

(65) Prior Publication Data

US 2022/0092397 A1    Mar. 24, 2022

(30) Foreign Application Priority Data

Sep. 22, 2020 (FR) ..................................... 20 09595

(51) Int. Cl.
*G06N 3/063* (2023.01)
*G06N 3/04* (2023.01)
*G06N 3/08* (2023.01)

(52) U.S. Cl.
CPC ............... *G06N 3/063* (2013.01); *G06N 3/04* (2013.01); *G06N 3/08* (2013.01)

(58) Field of Classification Search
None
See application file for complete search history.

(56) References Cited

U.S. PATENT DOCUMENTS

2018/0373977 A1\* 12/2018 Carbon ................. G06N 3/048
2019/0228051 A1\* 7/2019 Langhammer .......... G06F 17/16

FOREIGN PATENT DOCUMENTS

FR        3 045 892 A1    6/2017
WO    WO 2017/108398 A1    6/2017
WO    WO 2020/043753 A1    3/2020

OTHER PUBLICATIONS

French Preliminary Search Report issued Jun. 10, 2021 in French Application 20 09595 (with English Translation of Categories of Cited Documents), 3 pages.

(Continued)

*Primary Examiner* — Eric Nilsson
(74) *Attorney, Agent, or Firm* — Oblon, McClelland, Maier & Neustadt, L.L.P.

(57) ABSTRACT

An electronic calculator comprises a plurality of electronic calculation blocks, each of which is configured to implement one or more respective processing layers of an artificial neural network. The calculation blocks are of at least two different types among: a first type with fixed topology, fixed operation, and fixed parameters, a second type with fixed topology, fixed operation, and modifiable parameters, and a third type with modifiable topology, modifiable operation, and modifiable parameters. For each processing layer implemented by the respective calculation block, the topology is a connection topology for each artificial neuron, the operation is a type of processing to be performed for each artificial neuron, and the parameters include values determined via training of the neural network.

20 Claims, 6 Drawing Sheets

(56) References Cited

OTHER PUBLICATIONS

Jun Yin, et al., "A Skeleton-based Action Recognition System for Medical Condition Detection" State Key Laboratory of ASIC and System, Fudan University, 2019, 4 pages.

Xuechao Wei, et al., "TGPA: Tile-Grained Pipeline Architecture for low Latency CNN Inference" ICCAD '18, Association for Computing Machinery, 2018, 8 pages.

Paul N. Whatmough, et al., "FixyNN: Efficient Hardware for Mobile Computer Vision via Transfer Learning" Proceedings of the $2^{nd}$ SysML Conference, 2019, 13 pages.

* cited by examiner

ELECTRONIC CALCULATOR FOR THE IMPLEMENTATION OF AN ARTIFICIAL NEURAL NETWORK, WITH CALCULATION BLOCKS OF SEVERAL TYPES

CROSS-REFERENCE TO RELATED APPLICATIONS

This application is a U.S. non-provisional application claiming the benefit of French Application No. 20 09595, filed on Sep. 22, 2020, which is incorporated herein by reference in its entirety.

FIELD

The present invention relates to an electronic calculator configured to implement an artificial neural network having a plurality of processing layers, the calculator comprising a plurality of electronic calculation blocks, each configured to implement one or more respective processing layers.

The invention relates to the field of architecture of electronic calculators for implementing artificial neural networks, also known as ANNs (Artificial Neural Networks).

Such calculators offer, via the implementation of these neural networks, numerous applications, such as, for example, the classification or identification of objects previously detected by an object detector, making it possible, for example, to learn the identities of people whose faces have been detected by a face detector. Another example of the application is the automatic and unsupervised learning of features, such as human voice features, and the learned features are then used to preprocess data for specialized learning about a person's voice.

The invention relates in particular to the field of deep neural networks, also known as DNNs (Deep Neural Networks). In this field, one of the most used topologies is the convolutional neural network, also called convolutional neural network.

BACKGROUND

Convolutional neural networks, also called CNNs (Convolutional Neural Networks), are nowadays classical calculation structures in image processing. Numerous electronic calculator solutions exist to seek to perform hardware optimization during the inference and learning of such neural networks and are presented hereafter according to their general approach of the calculation.

Generic calculation solutions include CPU (Central Processing Unit), and GPU (Graphics Processing Unit) calculators, which are not exclusively specialized in the implementation of neural networks. These solutions are widely used for network exploration, but their genericity and complexity do not allow them to reach a sufficient performance per watt for constrained applications, such as edge computing applications. The most advanced solution in the field of GPUs is currently developed by NVIDIA® through its TensorRT™ library and it consists in dynamically optimizing the neural network for the GPU operators, then freezing the optimized network.

However, this approach does not offer flexibility of the application once optimized for the GPU.

Dedicated programmable topology solutions comprise specialized programmable calculators, such as Nervana™ NNP-I (Neural Network Processors), from the company Intel®, TPU (Tensor Processing Unit) from Alphabet Inc., FPGA (Field Programmable Gate Array) with flexible DNN or Soft DPU processing units (Soft DNN Processing Unit) from the company XILINX®, etc. These specialized programmable calculators generally include a calculator core that has been designed and optimized for neural networks (TPU, Soft DPU). This core is used recursively to process the network and is reconfigured as a function of the processing layer considered. This approach allows to reach a good performance per watt.

However, these dedicated solutions with programmable topology pose several problems. First, the resources of these calculators must be allocated judiciously as a function of the processing layers considered, which is complex; and often the utilization rate of calculation modules within these calculators is not optimal. Secondly, the majority of these calculators use external memory of the DDR type (Double Data Rate), and the calculation time is therefore not totally predictable, leading to application criticality problems. Finally, the recursive use of the calculator resources induces high latencies and does not allow the use of a specific hardware optimization.

Fixed topology computing solutions also exist, especially in the form of FPGAs. Document WO 2020/043753 A1 describes an example of such a fixed topology calculator for computing a convolution layer of an artificial neural network.

However, if the neural network or the application evolves, then this requires modifying the whole calculator.

SUMMARY

The object of the invention is therefore to provide an improved electronic calculator for the implementation of artificial neural networks, in particular convolutional neural networks, also denoted CNN.

To this end, the invention has as its object an electronic calculator configured to implement an artificial neural network having a plurality of processing layers,
  the calculator comprising several electronic calculation blocks, each one being configured to implement one or more respective processing layers,
  the calculation blocks being of at least two different types from the group of types consisting of:
    a first type with fixed topology, fixed operation, and fixed parameters,
    a second type with fixed topology, fixed operation, and modifiable parameters, and
    a third type with modifiable topology, modifiable operation, and modifiable parameters,
  for the processing layer(s) implemented by the respective calculation block, the topology being a connection topology for each artificial neuron of the processing layer(s), the operation being a type of processing to be carried out for each artificial neuron of the processing layer(s), and the parameters including values being able to be determined via a learning of the neural network, such as a weight value and/or a bias value for each artificial neuron of the processing layer(s).

Thus, the electronic calculator according to the invention offers a heterogeneous flexibility, with these calculation blocks being of at least two different types, and preferably of three different types, among the first type with fixed topology, fixed operation, and fixed parameters; the second type with fixed topology, fixed operation, and modifiable parameters; and the third type with modifiable topology, modifiable operation, and modifiable parameters.

In other words, the electronic calculator comprises a set of calculation blocks with different flexibility characteristics, which then allows the hardware architecture to be adapted to different applications without hardware change.

This electronic calculator is then realizable in the form of one or more programmable logic components, such as one or more FPGAs; while also being realizable in the form of one or more dedicated integrated circuits, such as one or more ASICs (Application-Specific Integrated Circuit).

The person skilled in the art will thus understand that the structure of the electronic calculator according to the invention is not completely parameterizable but contains calculation blocks of different types which are more or less parameterizable, and then preferably dedicated to certain layers of the network as a function of the parameterization need of each layer.

This variable flexibility from one calculation block to another also allows strong hardware optimization, such as operator simplification, parameter quantization, etc.

Preferably, each calculation block includes at least one calculator module, and the electronic calculator according to the invention further comprises a multiplexer connected to the output of at least two separate calculation modules of the same calculation block or of separate calculation blocks, in particular of calculation blocks of different types, and advantageously at the output of each of the calculation blocks of different types, and even more advantageously at the output of each of the calculation modules of the different calculation blocks, which then makes it possible to recover the values at the output of different layers of the network, and even more advantageously at the output of each of the layers of the network, and thus to offer greater applicative flexibility According to other advantageous aspects of the invention, the electronic calculator comprises one or more of the following features, taken alone or in any technically possible combination:
  each calculation block comprises at least one calculation module, and the calculator further comprises a multiplexer connected at the output of at least two separate calculation modules, the calculation modules at the output of which the multiplexer is connected being calculation modules of the same calculation block or of separate calculation blocks, in particular calculation blocks of different types,
  the multiplexer being preferably connected to the output of each of the calculation blocks of different types.
  the multiplexer being preferably also connected to the output of each of the calculation modules.
  each calculation module being preferably configured to implement a respective processing layer.
    the calculation blocks are of three different types from the group of types consisting of: the first type, the second type and the third type.
    the calculation blocks of different types are connected in cascade.
    the calculation blocks of different types are connected in ascending order of types,
  the types of the cascaded calculation blocks being preferably successively the first type, the second type and the third type,
  each calculation block of the first type being preferably further configured to implement one or more initial layers of processing, each calculation block of the second type being configured to implement one or more intermediate layers of processing, and each calculation block of the third type being configured to implement one or more final layers of processing, the initial, intermediate, and final layers being stacked in this order from the input of the neural network to its output.
  the neural network is a convolutional neural network, the processing layers are each selected from the group consisting of a convolution layer, pooling layer, correction layer, fully connected layer, and loss layer; and each operation is then selected from the group consisting of convolution operation, pooling operation, correction operation, fully connected operation, and loss operation.
  the calculator further comprises a preprocessing block configured to transform data received as input from the neural network and deliver the transformed data to at least one calculation block.
  the calculator further comprises a post-processing block configured to transform the data coming from at least one calculation block into data delivered as output from the neural network.
  the calculator is realized in the form of one or more programmable logic components, such as one or more FPGAs; and
  the calculator is realized in the form of one or more dedicated integrated circuits, such as one or more ASICs,
  at least one dedicated integrated circuit including an interposer receiving several chips, and each calculation block being realized as a respective chip.

BRIEF DESCRIPTION OF THE DRAWINGS

These features and advantages of the invention will become clearer upon reading the following description, given only as a non-limiting example, and made with reference to the appended drawings, in which.

DETAILED DESCRIPTION

Figure 1:
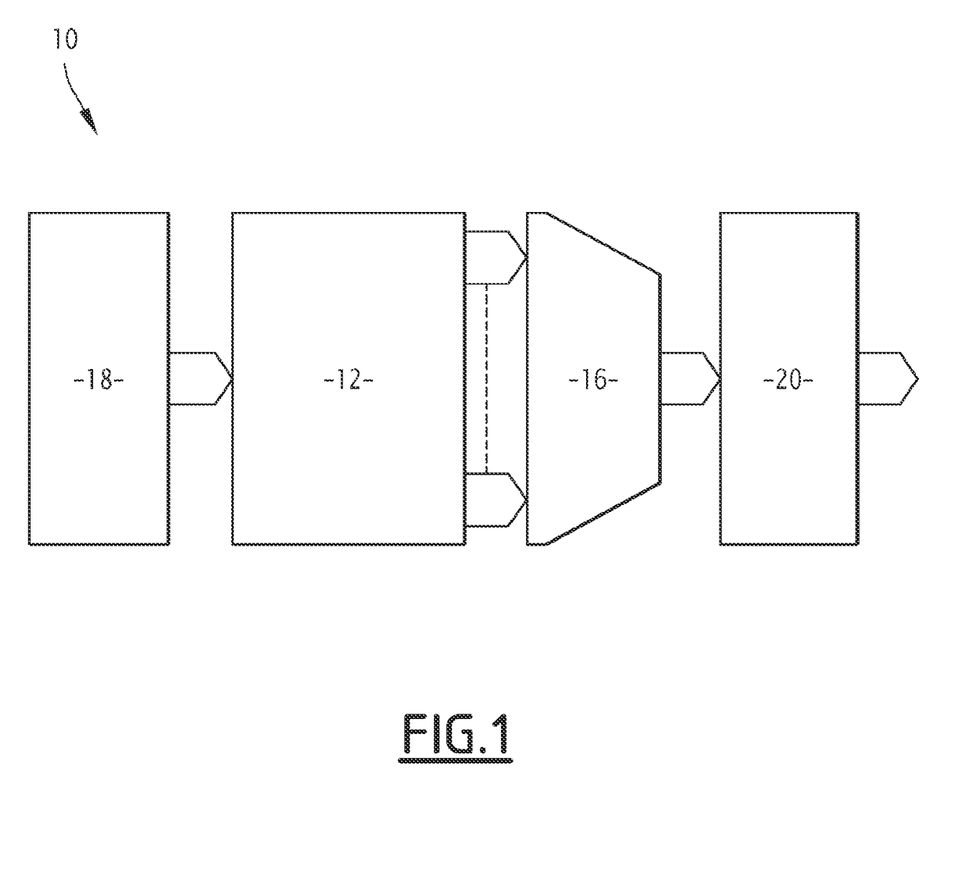
FIG. 1 is a schematic representation of an electronic calculator according to the invention, configured to implement an artificial neural network including several processing layers, the calculator comprising a set of electronic calculation blocks, each configured to implement one or more respective processing layers; the calculator optionally comprising a multiplexer connected to the output of the set of calculation blocks, as well as a pre-processing block connected to the input of the set of calculation blocks and a post-processing block connected to the output of the multiplexer.
Figure 2:
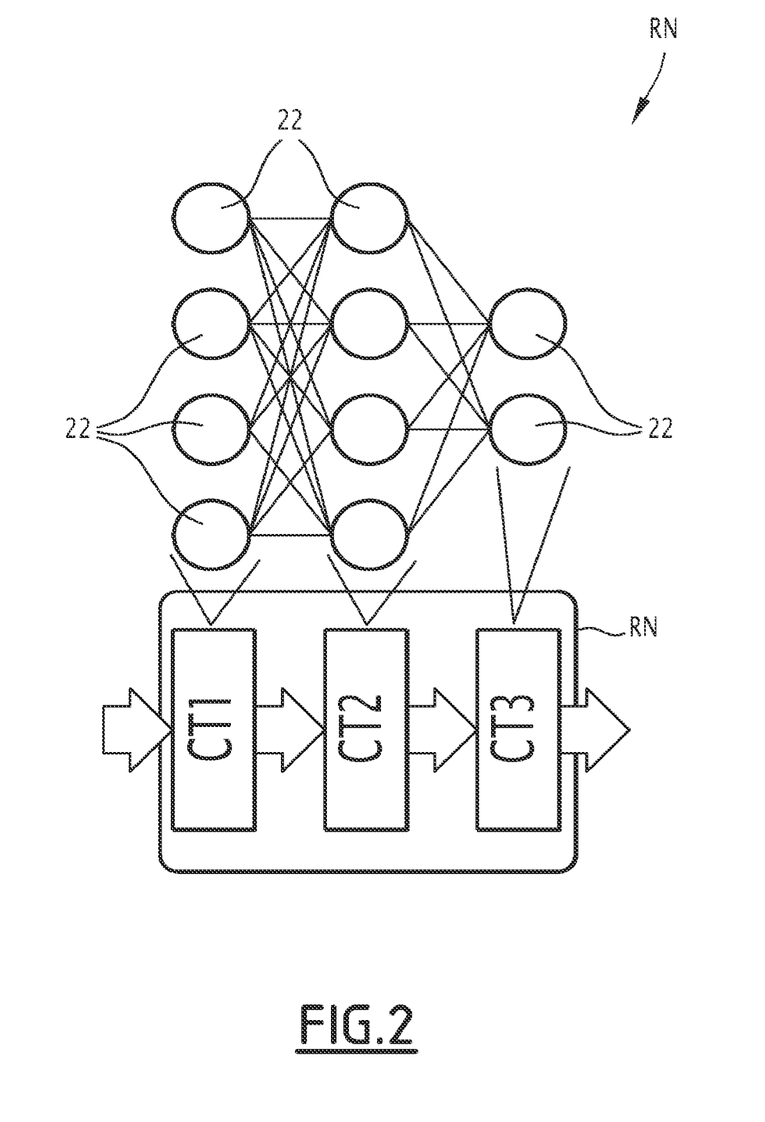
FIG. 2 is a schematic representation of successive processing layers of the artificial neural network implemented by the electronic calculator of FIG. 1.
Figure 4:
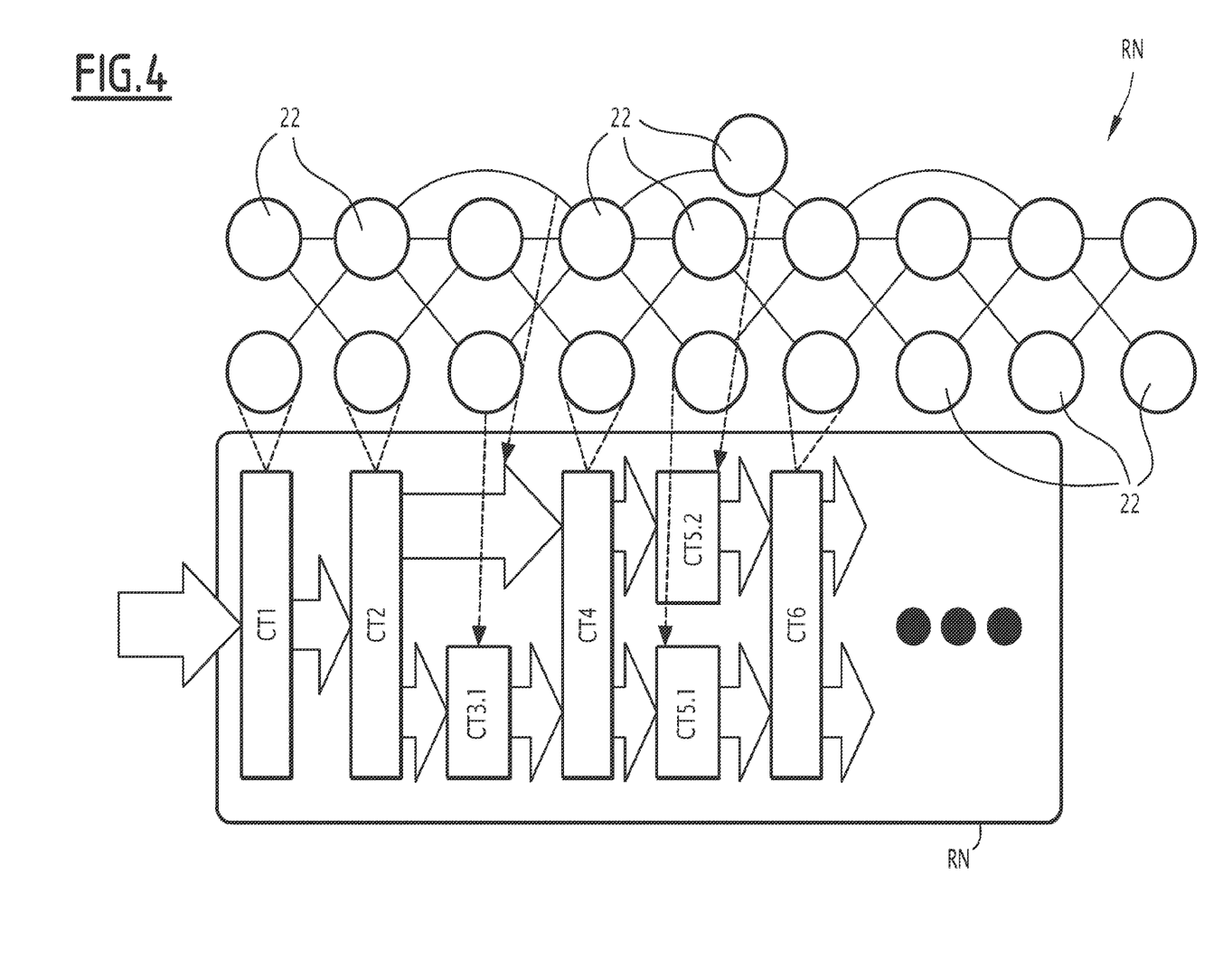
FIG. 4 is a view similar to that of FIG. 2 for a so-called residual neural network.

In FIG. 1, an electronic calculator 10 is configured to implement an artificial neural network RN, visible in FIG. 2 and including a plurality of processing layers CTi, where i is an index greater than or equal to 1. In the example of FIG. 2, the index is, for example, equal to 1, 2, and respectively 3, with first CT1, second CT2, and third CT3 processing layers shown in this FIG. 2. In the example of FIG. 4, the index is for example equal to 1, 2, 3.1, 4, 5.1, 5.2 and respectively 6, with processing layers CT1; CT2, CT3.1, CT4, CT5.1, CT5.2 and CT6 shown in this FIG. 4.

The electronic calculator 10, visible in FIG. 1, comprises a set 12 of a plurality of electronic calculation blocks 14, each electronic calculation block 14 being configured to implement one or more respective processing layers CTi.

As an optional complement, the electronic calculator 10 further comprises a multiplexer 16 connected to the output of the set 12 of calculation blocks 14.

As a further optional addition, the electronic calculator 10 further comprises a pre-processing block 18 connected to the input of the set 12 of calculation blocks 14, and/or a post-processing block 20 connected to the output of the multiplexer 16.

The electronic calculator 10 is, for example, in the form of one or more programmable logic components, such as one or more FPGAs (Field Programmable Gate Array).

Alternatively, the electronic calculator 10 is in the form of one or more dedicated integrated circuits, such as one or more ASICs (Application-Specific Integrated Circuit). According to this variant, at least one dedicated integrated circuit preferably includes an interposer receiving several electronic chips, and each calculation block 14 is in the form of a respective electronic chip.

FIG. 2 illustrates a plurality of respective and successive processing layers CTi of the neural network RN, with i integer index greater than or equal to 1, each respective processing layer CTi including, as known per se, one or more artificial neurons 22, also called formal neurons.

Each artificial neuron 22 is related to a connection topology, i.e. a pattern of interconnection of the neuron 22 with the elements located at the input of the said neuron 22 on the one hand, and at the output of the said neuron 22 on the other hand. As an example, each neuron 22 of the first processing layer CT1 is connected at its input to one or more input variables, not shown, of the neural network RN, and at its output to the successive processing layer, i.e. to the second processing layer CT2, in particular to one or more neurons 22 of the said second processing layer CT2. Each artificial neuron 22 of an intermediate processing layer, such as the second processing layer CT2 in the example of FIG. 2, is connected on the input to the previous processing layer, in particular to one or more artificial neurons 22 of the said previous layer, and on the output to the next processing layer, in particular to one or more artificial neurons 22 of the said next layer. Finally, each artificial neuron 22 of the last processing layer, such as the third processing layer CT3 in the example of FIG. 2, is connected on the input to the previous processing layer, i.e., to the penultimate processing layer, in particular to one or more artificial neurons 22 of the said previous layer, and as output to one or more output variables, not shown, of the neural network RN.

The connection topology for each artificial neuron 22 then defines, on the one hand, the elements, namely input variable(s) or neuron(s) 22 of the previous layer, to which the said artificial neuron 22 is connected in input; and on the other hand, the element(s), namely neuron(s) 22 of the next layer or output variable(s), to which the said artificial neuron 22 is connected in output.

Each artificial neuron 22 is also related to an operation, i.e. a type of processing, to be performed by the said artificial neuron 22 within the corresponding processing layer.

Each artificial neuron 22 is then typically able to perform a weighted sum of values received as input from the element(s) connected to its input, each input value then being multiplied by a respective weight value, then to apply an activation function, typically a non-linear function, to the said weighted sum, and to deliver to the element(s) connected to its output the value resulting from the application of the said activation function. As is known per se, the activation function, also referred to as the thresholding function or transfer function, allows for the introduction of a non-linearity in the processing performed by each artificial neuron 22. Classic examples of such an activation function are the sigmoid function, the hyperbolic tangent function, and the Heaviside function.

As an optional complement, the artificial neuron 22 is also capable of further applying a multiplicative factor, also called bias, to the output of the activation function, and the value delivered to the element(s) connected to the output is then the product of the bias value and the output value of the activation function.

The neural network RN is for example a convolutional neural network, and the processing layers CT1, CT2, CT3 are then typically each selected from the group consisting of a convolution layer, a pooling layer, a correction layer, a fully connected layer, and a loss layer. The operation related to each artificial neuron 22 is then typically chosen from the group consisting of: a convolution operation, a pooling operation, a correction operation, a fully connected operation, and a loss operation.

The skilled person will understand that the invention is generally applicable to many types of neural networks RN, including neural networks RN where the various processing layers CTi are arranged as a simple chain of successive processing layers CTi, as shown schematically in FIG. 2. Such neural networks RN with successive processing layers CTi arranged in the form of a single simple chain are, for example, convolutional neural networks, also referred to as CNN and as described above; fully connected neural networks, also referred to as FC; recurrent neural networks; neural networks with a first fully convolutional part followed by a second fully deconvolutional part; or even neural networks with auto-encoder (auto-encoder network).

The skilled person will understand that the invention also applies to neural networks RN in which the different processing layers CTi are arranged in the form of several chains, or branches, of processing layers CTi, these chains being at least partly parallel to one another. The invention then applies in particular to so-called residual RN neural networks, as shown schematically in FIG. 4. In the example of FIG. 4, the neural network RN includes two parts with multiple branches, a first part with two branches corresponding to the processing layer CT4 connected on the one hand directly to the output of the processing layer CT2 and on the other hand to the output of the processing layer CT3.1, which is itself connected to the output of the processing layer CT2. A second part with two branches corresponds to the processing layer CT6 connected to the output of the processing layer CT5.1 on the one hand and to the processing layer CT5.2 on the other hand, each of which is itself connected to the output of the processing layer CT4.

The set 12 of calculation blocks 14 comprises, according to the invention, calculation blocks 14 of at least two different types from the group of types consisting of: a first type with fixed topology, fixed operation, and fixed parameters, also noted TOPF; a second type with fixed topology, fixed operation, and modifiable parameters, also noted TOF; and a third type with modifiable topology, modifiable operation, and modifiable parameters, also noted TOPP.

Figure 3:
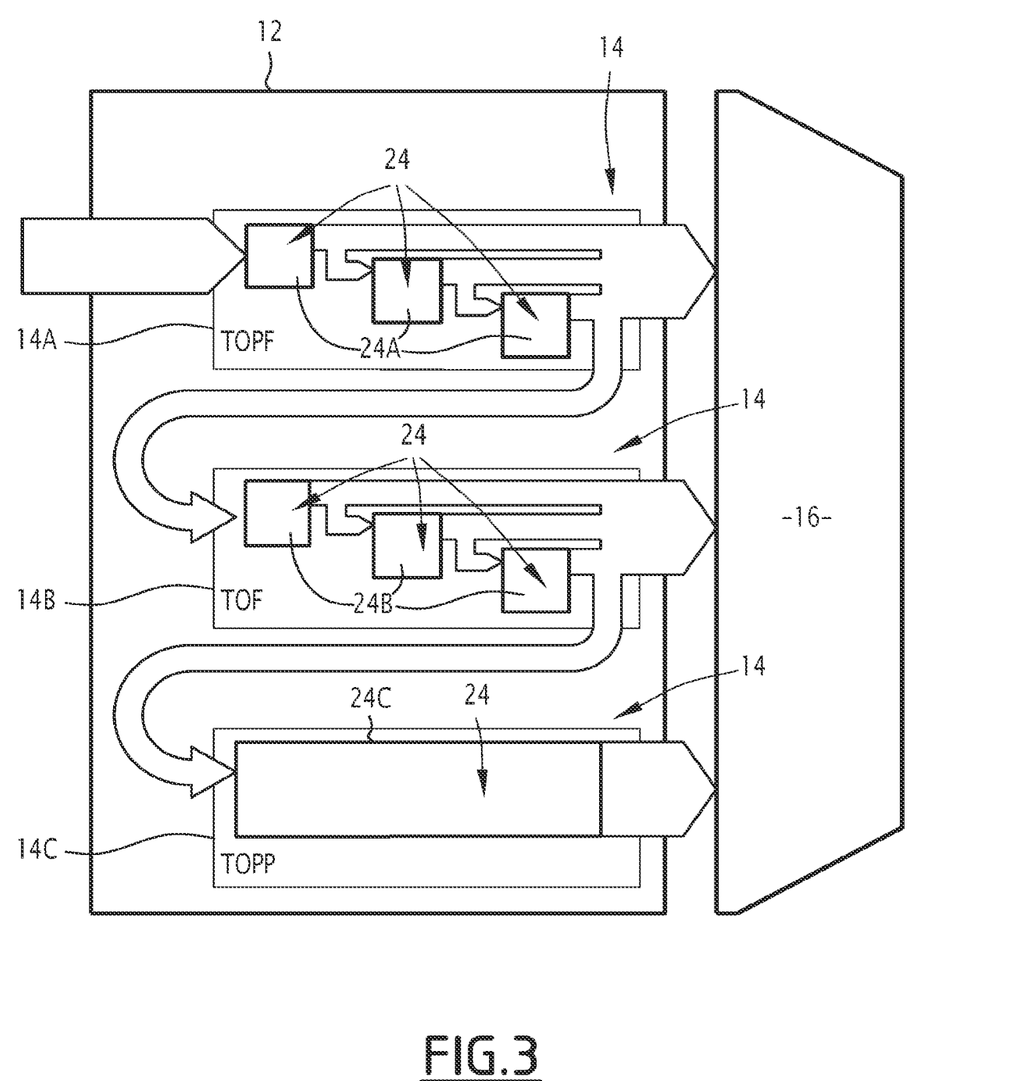
FIG. 3 is a more detailed schematic representation of the set of calculation blocks and the multiplexer of the electronic calculator of FIG. 1 according to a first embodiment.
Figure 5:
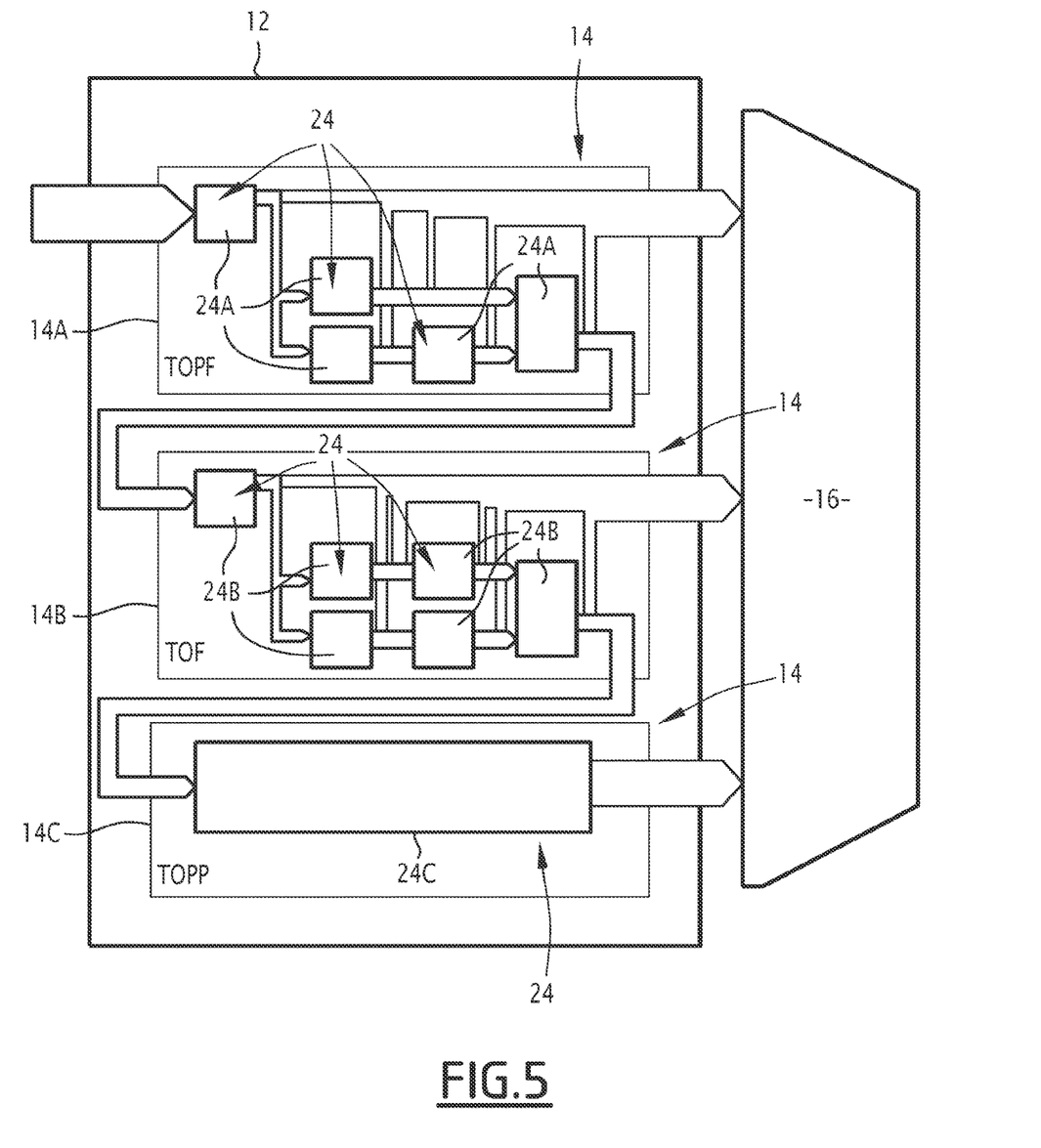
FIG. 5 is a view similar to that of FIG. 3, according to a second embodiment.
Figure 6:
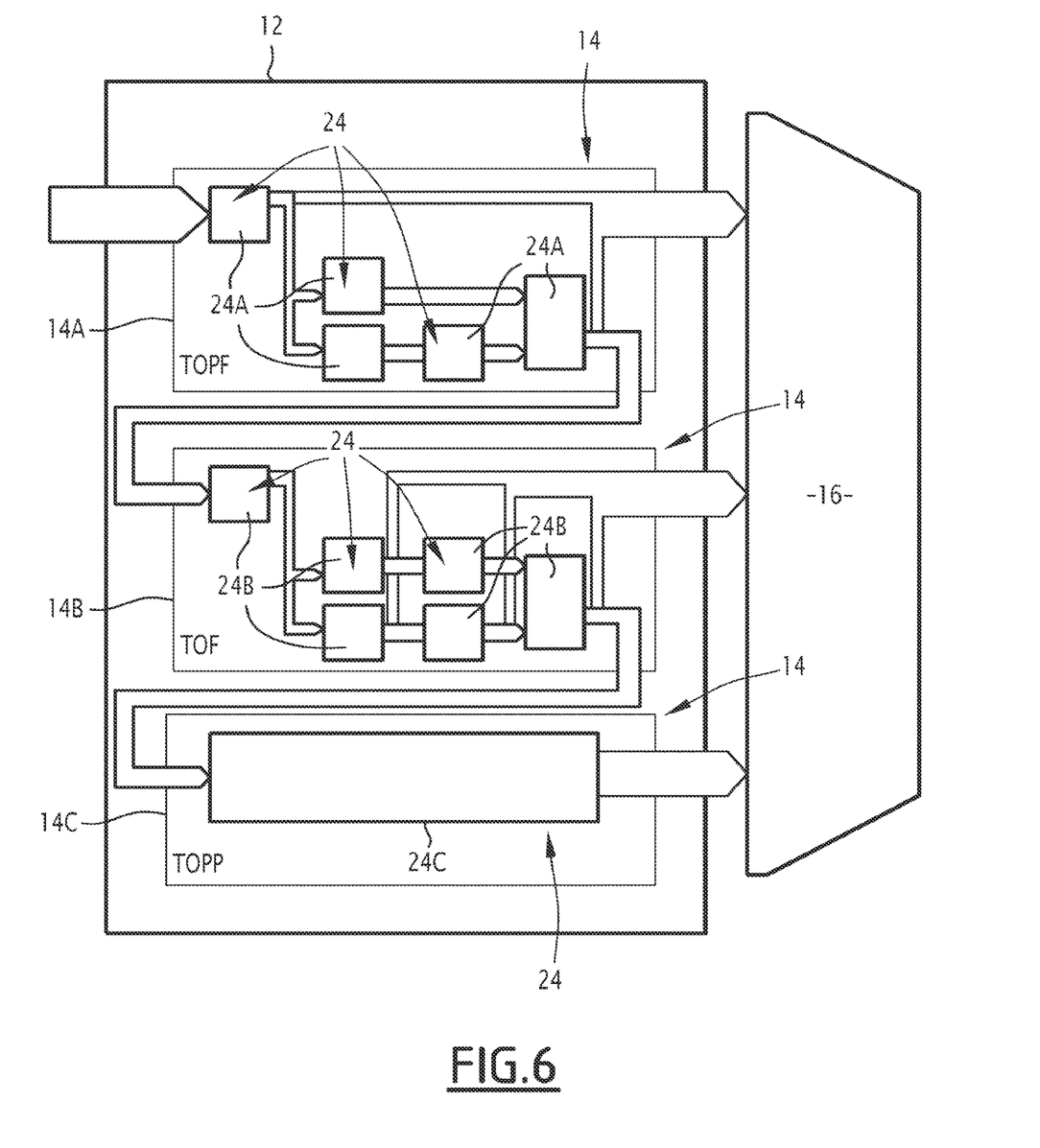
FIG. 6 is a view similar to FIG. 3, according to a third embodiment.

In the examples of FIGS. 3, 5, and 6, the set 12 comprises a first calculation block 14A of the first type TOPF, a second calculation block 14B of the second type TOF, and a third calculation block 14C of the third type TOPP.

For the processing layer(s) implemented by the respective calculation block 14, such as the first calculation block 14A, the second calculation block 14B, or the third calculation block 140, the topology is the connection topology of each artificial neuron 22 included in the corresponding processing layer CTi, the operation is the type of processing to be performed for each artificial neuron 22 of the said corresponding processing layer CTi, and the parameters are the values related to each artificial neuron 22 of the said corresponding processing layer CTi and able to be determined via a learning of the neural network RN, these parameters typically including for each artificial neuron 22 a weight value and/or a bias value.

The skilled person will then understand that, for each calculation block 14 of the first TOPF type, the connection topology, the type of processing to be carried out and the parameters of each artificial neuron 22 of the processing layer(s) CTi respectively implemented by the said calculation block of the first TOPF type are then fixed, i.e. set, prior to the implementation, i.e. instantiation, of the said calculation block 14 of the first TOPF type, and are then no longer modifiable after the implementation of the said block of the first TOPF type.

For each calculation block 14 of the second type TOF, the connection topology and the type of processing to be performed for each artificial neuron 22 of the processing layer(s) CTi respectively implemented by the said block of the second type TOF are also frozen, or fixed, before the implementation of the said block of the second type TOF; and the parameters related to the said artificial neuron 22 of the processing layer(s) CTi implemented by the second type of TOF calculation block are modifiable, and can be modified, including after the implementation of the said second type of TOF calculation block.

Finally, for each calculation block 14 of the third TOPP type, the person skilled in the art will understand that the connection topology, the type of processing to be performed and the parameters of each artificial neuron 22 of the processing layer(s) CTi respectively implemented by the said calculation block of the third TOPP type are all modifiable and are in particular susceptible to be modified after the implementation of the said calculation block of the third TOPP type.

Each calculation block 14 includes at least one calculation module 24, that is, includes one or more calculation modules 24. Each calculation module 24 is preferably configured to implement a respective processing layer CTi. Each calculation module 14 is also denoted as PE (Process Element).

In the examples of FIGS. 3, 5, and 6, the first calculation block 14A includes a plurality of calculation modules 24, also referred to as first calculation modules 24A; the second calculation block 14B also includes a plurality of calculation modules 24, also referred to as second calculation modules 24B; and the third calculation block 14C includes a single calculation module 24, also referred to as third calculation module 24C.

The skilled person will then observe that each calculation module 24 is of the same type as the calculation block 14 within which it is included. In the examples of FIGS. 3, 5 and 6, each first calculation module 24A is then a calculation module of the first type TOPF, each second calculation module 24B is a calculation module of the second type TOF, and the third calculation module 24C is a calculation module of the third type TOPP.

The calculation block 14 of the first type TOPF is, for example, a calculation block as described in the document WO 2020/043753 A1 and for which the parameters, in particular the weights related to the artificial neurons, are frozen. The calculation block 14 of the first type TOPF then corresponds to the calculator CONV described in the said document with frozen artificial neuron parameters, each calculation module 24 of the first type TOPF then corresponding to a respective PE_BLOC set described in this document WO 2020/043753 A1.

The calculation block 14 of the second type TOF is, for example, a calculation block as described in the document WO 2020/043753 A1 and for which the parameters, in particular the weights related to the artificial neurons, are modifiable. The calculation block 14 of the second type TOF then corresponds to the calculator CONV and each calculation module 24 of the second type TOF corresponding to a respective PE_BLOC set, with also the possibility of modifying the parameters of the artificial neurons, in particular their weight values.

The calculation block 14 of the third type TOPP is, for example, a calculation block as described in FR 3 045 892 A1 and WO 2017/108398 A1, for which the interconnection of the neurons, the type of processing performed by the neurons and the weights of the neurons are programmable and are then modifiable.

As an optional complement, the calculation blocks 14 of the set 12 are of three different types from the group of types consisting of: the first type TOPF, the second type TOF, and the third type TOPP. In other words, the set 12 includes at least three calculation blocks 14 of different types, i.e., includes at least one calculation block 14 of the first type TOPF, at least one calculation block 14 of the second type TOF, and at least one calculation block 14 of the third type TOPP. The examples in FIGS. 3, 5, and 6 illustrate this optional complement, with the set 12 shown in FIGS. 3, 5, and 6 comprising three calculation blocks 14 of three different types, with the first calculation block 14A being of the first type TOPF, the second calculation block 14B being of the second type TOF, and the third calculation block 14C being of the third type TOPP.

As a further optional complement, the calculation blocks 14 of different types are preferably connected in cascade, i.e., one after the other. In the examples of FIGS. 3, 5 and 6, the first calculation block 14A, the second calculation block 14B and the third calculation block 14C are connected in cascade. In particular, the first block 14A is connected to the input of the second block 14B, which in turn is connected to the input of the third block 14C.

As a further optional complement, the calculation blocks 14 of the different types are preferably connected according to an ascending order of type. In other words, a calculation block 14 of the first type TOPF is according to this optional complement, connected to the input of a calculation block 14 of the second type TOF or else of the third type TOPP. A calculation block 14 of the second type TOF is then, according to this optional complement, connected to the output of a calculation block 14 of the first type TOPF and/or to the input of a calculation block 14 of the third type TOPP. A calculation block 14 of the third type TOPP is then, according to this optional complement, connected to the output of a calculation block 14 of the first type TOPF and/or to the output of a calculation block 14 of the second type TOF.

According to this optional complement, the types of the cascaded calculation blocks 14 are preferably successively the first type TOPF, the second type TOF, and the third type TOPP. The person skilled in the art will then observe that in the examples of FIGS. 3, 5, and 6, the first 14A, second 14B, and third 14C calculation blocks are connected in cascade and in that order.

According to this optional complement, each first type TOPF calculation block 14 is preferably further configured to implement one or more initial layers of processing of the neural network RN, each second type TOF calculation block 14 being configured to implement one or more intermediate layers of processing of the neural network RN, and each calculation block 14 of the third type TOPP being configured to implement one or more final layers of processing of the neural network RN, the initial, intermediate and final layers being stacked in this order from the input of the neural network RN to its output.

In the example of FIGS. 2 and 3, the first calculation block 14A of the first type TOPF is then for example configured to implement the first processing layer CT1, forming an initial processing layer of the neural network RN of FIG. 2; the second calculation block 14B of the second type TOF is configured to implement the second processing layer CT2 forming an intermediate layer of the neural network RN of FIG. 2; and the third calculation block 14C is configured to implement the third processing layer CT3 forming a final processing layer of the neural network RN of example 2 of FIG. 2.

When a respective calculation block 14 includes multiple calculation modules 24, the said calculation modules 24 are preferably connected in cascade within the said calculation block. In the example of FIG. 3, then, the first calculation modules 24A are cascaded within the first calculation block 14A, and the second calculation modules 24B are also cascaded within the second calculation block 14B. In other words, in the example of FIG. 3, when multiple calculation modules 24 are included within a single calculation block 14, such as the first calculation modules 24A included in the first calculation block 14A, and respectively the second calculation modules 24B included in the second calculation block 14B, these calculation modules 24 are for example arranged as a single chain of modules 24 within the corresponding calculation block 14. The calculation blocks 14 according to this embodiment of FIG. 3 are then particularly able to implement the neural networks RN where the different processing layers CTi are arranged in the form of the single chain of successive processing layers CTi, visible in FIG. 2.

Alternatively, these multiple calculation modules 24 within a single calculation block 14 are arranged as multiple chains of modules 24 within the said calculation block 14, as shown in the examples of embodiment of FIGS. 5 and 6. The calculation blocks 14 according to these examples of embodiments of FIGS. 5 and 6 are then particularly able to implement the neural networks RN where the different processing layers CTi are arranged in the form of several chains of processing layers CTi, in particular the so-called residual neural networks RN, such as the one visible in FIG. 4.

In FIGS. 5 and 6, the first calculation block 14A includes five first calculation modules 24A, and the first calculation module 24A arranged at the termination of the first calculation block 14A, i.e., the first calculation module 24A of the fourth rank, is for example connected on the one hand directly to the output of a first calculation module 24A of the second rank and on the other hand to the output of a first calculation module 24A of the third rank, which is itself connected to the output of a first calculation module 24A of the second rank. The first calculation block 14A is then particularly able to implement the first part of the neural network RN of FIG. 4, in particular the processing layers CT1, CT2, CT3.1 and part of CT4.

In FIGS. 5 and 6, the second calculation block 14B includes six second calculation modules 24B, and the second calculation modules 24B of the second and third ranks within the second calculation block 14B are for example connected in the form of two parallel branches. The second calculation block 14B is then particularly able to implement the second part of the neural network RN of FIG. 4, in particular the processing layers CT5.1 and CT5.2 via the second calculation modules 24B of the second and third ranks arranged in the form of two parallel branches.

The multiplexer 16 is connected to the output of the set 12 of the calculation blocks 14. The multiplexer 16 is typically connected to the output of at least two separate calculation modules 24, the calculation modules 24 to the output of which the multiplexer 16 is connected being the calculation modules 24 of a single calculation block 14 or the calculation modules 24 of separate calculation blocks 14, particularly calculation blocks 14 of different types from among the first type TOPF, the second type TOF and the third type TOPP.

As an optional complement, the multiplexer 16 is connected to the output of each of the calculation blocks 14 of different types in the set 12. In other words, if the set 12 includes calculation blocks 14 of two different types from the first type TOPF, the second type TOF, and the third type TOPP, the multiplexer 16 is connected to the output of at least two of these calculation blocks 14 of two different types; and if the set 12 includes at least three calculation blocks 14 of the three different types among the aforementioned types, then the multiplexer 16 is connected to the output of at least one calculation block of the first type TOPF, to the output of at least one calculation block of the second type TOF and to the output of at least one calculation block of the third type TOPP. In the examples of FIGS. 3, 5 and 6, the multiplexer 16 is connected to the output of both the first calculation block 14A of the first type TOPF, the second calculation block 14B of the second type TOF and the third calculation block 14C of the third type TOPP.

As a further optional complement, the multiplexer 16 is connected to the output of each of the calculation modules 24 of the individual calculation blocks 14. In particular, in the examples of FIGS. 3 and 5, the multiplexer 16 is connected to the output of all of the first calculation modules 24A of the first calculation block 14A, as well as to the output of all of the second calculation modules 24B of the second calculation block 14B, as well as to the output of the third calculation module 24C of the third calculation block 14C.

Alternatively, the multiplexer 16 is connected to the output of only some of the calculation modules 24. In particular, in the example shown in FIG. 6, the multiplexer 16 is connected to the output of only some of the first calculation modules 24A of the first calculation block 14A, as well as to the output of only some of the second calculation modules 24B of the second calculation block 14B.

The preprocessing block 18 is configured to transform data that is received as input from the neural network RN and deliver the transformed data to at least one corresponding calculation block 14. The transformation performed by the pre-processing block 18 on the data received as input from the neural network RN is, for example, a geometric transformation, a colorimetric transformation, or a filtering, or even a combination of all or part of these geometric, colorimetric, and filtering transformations.

The post-processing block 20 is configured to transform the data coming from at least one calculation block 14 into data delivered as output from the neural network RN. The post-processing block 20 is, for example, connected to the output of the multiplexer 16, and the data coming from the corresponding calculation block 14 and able to be transformed by the post-processing block 20 are then selected by the multiplexer 16. The transformation performed by the post-processing block 20 on the data coming from at least one calculation block 14 is, for example, a selection, a concatenation of data coming from several outputs, a rescaling, or a sorting, or even a combination of all or part of these selection, concatenation, scaling, and sorting.

The set 12 composed of at least two calculation blocks 14 of different types among the first type TOPF with fixed topology, fixed operation and fixed parameters, the second type TOF with fixed topology, fixed operations and modifiable parameters, and the third type TOPP with modifiable topology, modifiable operations and modifiable parameters, the said at least two calculation blocks 14 of different types being connected in any order within the set 12, then makes it possible to obtain an electronic calculator 10 according to the invention offering heterogeneous flexibility. The flexibility offered by each type of calculation block 14 among the first type TOPF, the second type TOF and the third type TOPP is indeed variable from one type to another.

The calculation block 14 of the first type TOPF typically has a pipeline architecture and consists of a set of calculation modules 24 with fixed topology, operation, and parameters. Each calculation module 24 of the first TOPF type is then typically built and optimized for a single topology and operation of the neural network RN; and the parameters—such as weight values and bias values—of that portion of the network corresponding to the calculation module 24 of the first TOPF type are also fixed. These calculation modules 24 of the first TOPF type are preferably chained to each other and some or all of their outputs are then connected to the multiplexer 16 to allow their selection. The outputs of the or the last calculation module(s) 24 of the calculation block 14 of the first type TOPF are then connected to the next calculation block 14.

The second type TOF calculation block 14 also typically presents a pipeline architecture, and the second type TOF calculation module(s) 24 included in the said second type TOF calculation block also have a fixed, or frozen, topology and operation; with the difference that the parameters, in particular the weight and/or bias values, of the corresponding artificial neurons 22 are modifiable. This possibility of modifying the parameters for the calculation block 14 of the second TOF type then makes it possible to adapt the part of the network implemented by this calculation block 14 of the second TOF type to the target application. The said parameters can typically be modified at start-up, or during operation, for example in the case of online training of the neural network RN.

The calculation block 14 of the third type TOPP, on the other hand, is a calculator whose input and/or output topology is fixed, and typically depends on the output of the previous calculation block 14 and/or the inputs of the next calculation block 14, but whose topology, operation, and parameters of the part of the neural network corresponding to this calculation block 14 of the third type TOPP are modifiable, i.e. programmable.

As an optional complement, the multiplexer 16 allows to select, concatenate and/or combine one or more outputs of the set 12 of calculation blocks 14, and then forms a layer multiplexer, the different outputs of the set 12 corresponding to different outputs of processing layers CTi of the neural network RN, implemented by the said set 12.

According to this optional complement, the multiplexer 16 then provides greater applicative flexibility. For example, for the same neural network RN implemented, it is then possible to read only the output of the last processing layer of the neural network RN in the case of a classification application; or to read the outputs of intermediate layers of the neural network RN in the case of a segmentation application; or even to read a set of outputs of different layers in the case of an object detector, with optionally a stage aggregating characteristic layers by hierarchy.

With the electronic calculator 10 according to the invention, various hardware implementations are furthermore conceivable, the electronic calculator 10 being possible in the form of one or more programmable logic components, such as one or more FPGAs; or even in the form of one or more dedicated integrated circuits, such as one or more ASICs.

In the case of an embodiment based on programmable logic component(s), the electronic calculator 10 is, for example, instantiated, i.e., implemented, on an FPGA with a core, the FPGA then typically instantiating the set 12 of calculation blocks 14, and the core instantiating, for its part, the preprocessing block 18 and/or the post-processing block 20.

In the case of an implementation based on dedicated integrated circuit(s), the electronic calculator 10 is, for example, realized in the form of an ASIC also including an interposer capable of receiving several electronic chips. With this interposer, the set 12 of the different calculation blocks 14 is typically distributed, or partitioned, on several separate electronic chips. Each electronic chip is then assembled, i.e. coupled, via the interposer to the ASIC according to the calculation need, which makes it possible to offer even greater operating flexibility. With this interposer, each calculation block 14 is typically realized in the form of a respective dedicated chip.

It is thus conceived that the invention provides an improved electronic calculator 10 for implementing artificial neural networks, in particular convolutional neural networks CNN.

The invention claimed is:

1. An electronic calculator configured to implement an artificial neural network having multiple processing layers, the calculator comprising:
   a plurality of electronic calculation blocks, each configured to implement one or more respective processing layers of the multiple processing layers,
   wherein the calculation blocks, which implement the multiple processing layers are of at least two different types from among a group of types consisting of:
      a first type with fixed topology, fixed operation, and fixed parameters,
      a second type with fixed topology, fixed operation, and modifiable parameters, and
      a third type with modifiable topology, modifiable operation, and modifiable parameters, and
   for each processing layer implemented by a respective calculation block, the topology is a connection topology for each artificial neuron of the processing layer, the operation is a type of processing to be performed for each artificial neuron of the processing layer, and the parameters include values determined via training of the neural network.

2. The calculator according to claim 1, wherein each of the calculation blocks includes at least one calculation module, and the calculator further comprises a multiplexer connected to an output of at least two separate calculation modules, the calculation modules to which an output of the multiplexor is connected being calculation modules of a same calculation block or of separate calculation blocks.

3. The calculator according to claim 2, wherein the calculation modules to which the output of the multiplexor is connected are calculation blocks of different types.

4. The calculator according to claim 3, wherein the multiplexer is connected to the output of each of the calculation blocks of different types.

5. The calculator according to claim 2, wherein the multiplexer is connected to the output of each of the calculation modules.

6. The calculator according to claim 2, wherein each calculation module is configured to implement a respective processing layer of the multiple processing layers.

7. The calculator according to claim 1, wherein the calculation blocks are of three different types from the group of types consisting of the first type, the second type, and the third type.

8. The calculator according to claim 1, wherein the calculation blocks of different types are connected in cascade.

9. The calculator according to claim 8, wherein the calculation blocks of different types are connected in ascending order of types.

10. The calculator according to claim 9, wherein the types of the cascaded calculation blocks are successively the first type, the second type, and the third type.

11. The calculator according to claim 9, wherein each calculation block of the first type is configured to implement one or more initial layers of processing, each calculation block of the second type is configured to implement one or more intermediate layers of processing, and each calculation block of the third type is configured to implement one or more final layers of processing; and the initial, intermediate, and final layers are stacked in order from an input of the neural network towards an output of the neural network.

12. The calculator according to claim 1, wherein the parameters include a weight value and/or a bias value for each artificial neuron of the processing layers.

13. The calculator according to claim 1, wherein the neural network is a convolutional neural network, the processing layers are each selected from a group consisting of: a convolution layer, a pooling layer, a correction layer, a fully connected layer, and a loss layer; and each operation is selected from a group consisting of: a convolution operation, a pooling operation, a correction operation, a fully connected operation, and a loss operation.

14. The calculator according to claim 1, wherein the calculator further comprises a preprocessing block configured to transform data received as input from the neural network and deliver the transformed data to at least one calculation block of the plurality of calculation blocks.

15. The calculator according to claim 1, further comprising a post-processing block configured to transform data from at least one of the calculation blocks into data delivered at an output of the neural network.

16. The calculator according to claim 1, wherein the calculator is realized as one or more programmable logic components.

17. The calculator according to claim 16, wherein each programmable logic component is a FPGA.

18. The calculator according to claim 1, wherein the calculator is realized as one or more dedicated integrated circuits, and at least one dedicated integrated circuit includes an interposer receiving a plurality of chips, and each calculation block is in a form of a respective chip.

19. The calculator according to claim 18, wherein each of the at least one dedicated integrated circuit is an ASIC.

20. An apparatus configured to implement an artificial neural network having multiple processing layers, the apparatus comprising:

a plurality of calculation blocks, each configured to implement one or more respective processing layers of the multiple processing layers, wherein the calculation blocks are of at least two different types from among a group of types consisting of:
a first type with fixed topology, fixed operation, and fixed parameters,
a second type with fixed topology, fixed operation, and modifiable parameters, and
a third type with modifiable topology, modifiable operation, and modifiable parameters, for each processing layer implemented by a respective calculation block, the topology is a connection topology for each artificial neuron of the processing layer, the operation is a type of processing to be performed for each artificial neuron of the processing layer and the parameters includes values determined via training of the neural network, and the calculation blocks of different types are connected in ascending order of types.

* * * * *